United States Patent Office 3,394,175
Patented July 23, 1968

3,394,175
4,4' - BIS(HEPTAFLUOROISOPROPYL) - DIPHENYL
ETHER - 2,2' - DISULFONIC ACID AND ALKALI
METAL SALTS THEREOF
Everett E. Gilbert and Benjamin Veldhuis, Morristown,
N.J., assignors to Allied Chemical Corporation, New
York, N.Y., a corporation of New York
No Drawing. Filed Mar. 23, 1967, Ser. No. 625,321
2 Claims. (Cl. 260—512)

ABSTRACT OF THE DISCLOSURE

This invention relates to the new compound 4,4'-bis-(heptafluoroisopropyl)-diphenyl ether 2,2'-disulfonic acid and its alkali metal salts, of the formula

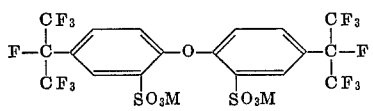

wherein M is hydrogen or an alkali metal.

---

The compounds of our invention are useful as surface active agents and as insecticides. This latter activity is surprising since the unsulfonated compound is not insecticidally active and it has been considered heretofore that sulfonation would act to detoxify biologically active compounds rather than conferring activity on an otherwise inactive compound.

The compounds of our invention can be prepared by sulfonation with sulfur trioxide of 4,4'-bis(heptafluoroisopropyl)-diphenyl ether to form the disulfonic acid, followed by treatment with an alkali metal hydroxide to produce the di-alkali metal salt, according to the equations shown below wherein potassium is indicated as illustrative of the alkali metal salt.

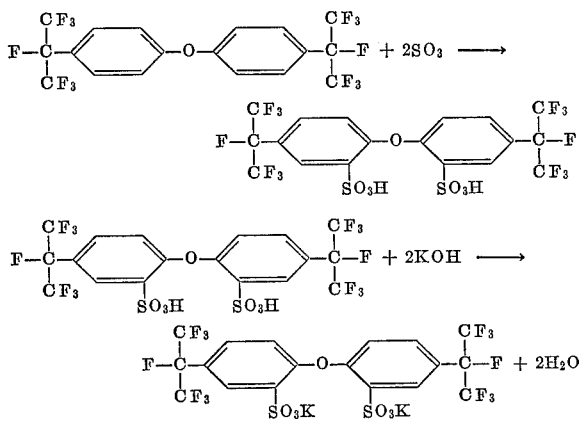

The sulfonation of the 4,4'-bis(heptafluoroisopropyl)-diphenyl ether is suitably carried out by dissolving the ether in an inert solvent such as trichlorofluoromethane, and adding thereto either pure $SO_3$ or a solution of stabilized liquid $SO_3$ in an inert solvent such as trichlorofluoromethane with which it can be added slowly to the ether solution at about 15°–20° C. with agitation. An amount of $SO_3$ is added which is equivalent to at least about 2 moles of $SO_3$ per mole of diphenyl ether compound, that is, at least sufficient $SO_3$ to replace two nuclear hydrogen atoms in ortho position with respect to the ether oxygen, preferably a slight excess, for example, up to about a 50% molar excess. After completion of addition of $SO_3$, the mixture is agitated for about an hour at room temperature (ca. 20°–25° C.). Other suitable sulfonating agents, for example oleum, sulfonic acid, $ClSO_3H$ or $FSO_3H$ can be used instead of $SO_3$ if desired. The resulting reaction product is then mixed with about an equal volume of water, and heated, for example, to about 35° C. to volatilize and remove the solvent leaving a water solution of the 4,4'-bis(heptafluoroisopropyl)-diphenyl ether-2,2'-disulfonic acid product.

If the di-alkali metal salt is the desired end product, the solution is mixed with the desired alkali metal hydroxide, suitably in aqueous solution, whereupon the solid di-alkali metal salt precipitates and is recovered as by filtration. The crude salt can be purified by dissolving in 95% ethanol, refluxing with decolorizing carbon, followed by filtration, concentration of the filtrate as by evaporation, crystallization of the product and filtering off the mother liquor.

The following specific examples further illustrate our invention. Parts are by weight except as otherwise noted.

Example 1.—Preparation of 4,4'-bis(heptafluoroisopropyl)-diphenyl ether disulfonic acid-diK salt 4,4'-bis(heptafluoroisopropyl) - diphenyl ether (12.4 grams-0.025 mole) made by treating the corresponding dihydroxy compound with $SF_4$ was dissolved in 40 ml. of trichlorofluoromethane in 125 ml. Erlenmeyer flask equipped with magnetic stirring. To this was added stabilized sulfur trioxide (6 grams-0.075 mole), dissolved in 20 ml. of trichlorofluoromethane, over a period of 10 minutes at 15–20° C. The reaction mixture was then stirred for 1 hour at room temperature. The product was then mixed with an equal volume of water, heated to 35° C. to remove the solvent, neutralized with 10% aqueous KOH, and filtered to obtain the solid potassium salt in 22 grams yield. It was purified by solution in 95% ethanol, refluxing with decolorizing carbon, filtering, evaporating down, crystallizing and filtering. A final yield of 13.4 grams of the desired 4,4'-bis(heptafluoroisopropyl)-diphenyl ether disulfonic acid-dipotassium salt was thus obtained.

Analysis showed this compound to be a hydrate containing 5.4% water. Theory for this hydrate 33.9% F; 8.2% S; found 32.8 F; 7.7% S. Theory for molecular weight 784; found 800.

In the same manner as that described above except that NaOH was used instead of KOH, the disodium salt was prepared.

Both the dipotassium and the disodium salts prepared above are slightly water soluble with high activity for the reduction of surface tension. Thus a 0.1% aqueous solution of the disodium salt had a surface tension of 37.7 dynes per square centimeter as compared to distilled water which has a surface tension of about 72 dynes per square centimeter; the surface tension of a 0.1% aqueous solution of the potassium salt was 34.0 dynes per square centimeter.

Example 2

The 4,4'-bis(heptafluoroisopropyl)-diphenyl ether disulfonic acid-dipotassium salt prepared in Example 1 above, was tested as an insecticide against pea aphid adults as follows:

A mixture was prepared of equal parts of acetone and water in which was dissolved an amount of 4,4'-bis (heptafluoroisopropyl)-diphenyl ether disulfonic acid-dipotassium salt equivalent to 2 pounds of salt per 100 gallons of solution.

(a) Then English broad bean plants were sprayed with this solution for 2 seconds on the upper surface and 5 seconds on the under surface.

(b) Then 10 adult female pea aphids (*Macrosiphum pisi*) were brushed from infested broad bean plants into 5 inch screen wire hemispheres and sprayed for 5 seconds at a rate of approximately 0.6 ml. delivery of solution per second from a nozzle at 20 p.s.i. pressure with the aphids 15 inches from the nozzle. Following treatment with the toxicant solution, the aphids were caged over broad bean plants which had been sprayed with toxicant as described in (a) above.

An observation of the infested plants 3 days after treatment showed 100% mortality, i.e. all the aphids were dead and no living young were present.

While the above describes the preferred embodiments of our invention, it will be understood that departures can be made therefrom within the scope of the specification and claims.

We claim:

1. 4,4' - bis(heptafluoroisopropyl) - diphenyl ether disulfonic acid and alkali metal salts thereof of the formula 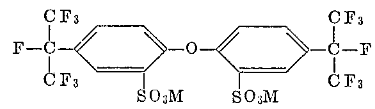 wherein M represents hydrogen or an alkali metal.

2. The process for preparing 4,4' - bis(heptafluoroisopropyl)-diphenyl ether-2,2'-disulfonic acid which comprises contacting 4,4'-bis(heptafluoroisopropyl)-diphenyl ether of the formula 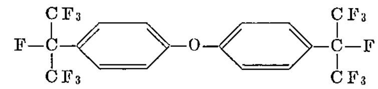 with sulfur trioxide in an amount equivalent to at least about 2 moles of $SO_3$ per mole of 4,4'-bis(heptafluoroisopropyl)-diphenyl ether in an inert, low boiling solvent, and thereafter removing the solvent and recovering the 4,4' - bis(heptafluoroisopropyl) - diphenyl ether - 2,2'-disulfonic acid.

References Cited

Stamatoff et al.: Chemical Abstracts 63, 18297c (1965).

DANIEL D. HORWITZ, *Primary Examiner.*